United States Patent [19]
Tice et al.

[11] 3,870,624
[45] Mar. 11, 1975

[54] HYDROGENATION CATALYST ACTIVATION

[75] Inventors: John D. Tice, Wilmington, Del.;
Robert I. Benner, Upper Chichester, Pa.

[73] Assignee: Sun Oil Company, Philadelphia, Pa.

[22] Filed: Aug. 2, 1971

[21] Appl. No.: 168,436

[52] U.S. Cl. ............................... 208/143, 208/264
[51] Int. Cl. ............................................. C10g 23/02
[58] Field of Search ........ 208/143, 264; 260/677 H, 260/683.9

[56] References Cited
UNITED STATES PATENTS

| | | | |
|---|---|---|---|
| 2,511,453 | 6/1950 | Barry | 260/677 H |
| 3,152,193 | 10/1964 | Fleming et al. | 260/677 H |
| 3,238,269 | 3/1966 | Holmes et al. | 260/677 H |
| 3,287,258 | 11/1966 | Mason | 208/143 |
| 3,516,926 | 6/1970 | Davis et al. | 208/143 |

*Primary Examiner*—Herbert Levine
*Attorney, Agent, or Firm*—George L. Church; Donald R. Johnson; Paul Lipsitz

[57] ABSTRACT

A sulfurizing agent such as $CS_2$ is injected into a hydrogenation reaction zone to reactivate the Group VI metal catalyst therein resulting in a longer cycle life and a lower temperature required to achieve a fixed conversion level. The injection preferably takes place at a pressure of at least about 300 psig, a temperature range of at least about 350°F. to at least about 700°F., a LHSV of at least about 0.2 to at least about 10.0, and a $CS_2$ concentration of at least about 0.05 to at least about 0.3 volume % of the feed being charged thereto.

5 Claims, No Drawings

HYDROGENATION CATALYST ACTIVATION

BACKGROUND OF THE INVENTION

As is well known in the chemical arts, catalysis is among the most difficult and unpredictable areas of the general science of chemistry. The characteristic holds especially true for the well-known metal sulfide catalysts employed in the hydrogenation refining of petroleum fractions.

According to prior art techniques, these catalysts are presulfided with a sulfurizing agent such as $CS_2$ dissolved in a carrier oil and hydrogen until the sulfur input of the reactor equals the sulfur output of the reactor. This technique is defined in U.S. Pat. No. 3,516,926 issued June 23, 1970. However that patent, as well as the art cited therein and other prior hydrogenation catalyst art, concerns itself solely with pretreatment of Group VI metal catalysts to enhance their original activity.

SUMMARY OF THE INVENTION

The present invention concerns itself with the reactivation and maintenance of presulfided metal catalysts on-stream. Catalysts which can be prepared by this process are broadly any of the Group VI metal sulfactive hydrogenation catalysts such as nickel, molybdenum cobalt, tungsten, and their sulfides or mixtures of such metals or their sulfides. Any well known catalyst carriers may be employed, such as alumina, silica, silica-alumina, zirconia, silica-alumina magnesia, or one of the natural or synthetic aluminosilicates. The preferred catalysts are combinations of nickel and molybdenum and their oxides, commercially available containing about 3w% of nickel oxide and about 10 to 15w% molybdenum oxide.

In one embodiment of the invention, a sulfided nickel-molybdenum catalyst such as American Cyanamid HDS-3A with 3.2w% nickel oxide, 15.1w% molybdenum oxide and surface area of 180m$^2$/gm., pore volume of 0.6 cc/gm. and apparent bulk density of 40 lb./ft.$^3$ is presulfided to its most active form with $H_2S$ or preferably with $CS_2$ such as is described in the reference patents. In service with chargestocks low in sulfur content, i.e. in the range of about 0.001w% to about 0.2w%, catalyst activity may gradually diminish due to reduction of the sulfur on the metal. Such a catalyst can be reactivated by the method of this invention by the injection of a sulfiding medium such as liquid $CS_2$. It is easily and accurately injected with a small positive displacement pump automatically controlled with ratio controller in proportion to the charge. An injection rate of at least about 0.05 to at least about 0.3 vol. % of the feed is probably adequate and can be continuous to maintain activity or periodic to rejuvenate the catalyst when it shows signs of reduced activity. A preferred method is to practice a regular maintenance schedule of $CS_2$ injections to provide an extended catalyst life. The regularity of said injections and the duration of each needed to achieve a desired result can be readily determined in a given instance by a person skilled in the art. Since the reaction proceeds more easily when the $H_2S$ partial pressure in the reaction zone is lower, the periodic injection method is preferred over the continuous injection method; however, as previously discussed, either method can be used. The advantages of this invention will become more readily apparent upon review of the following examples.

The operation conditions used in Example 1 and Example 2 are:
1000 psig
0.7 LHSV
Temp. as noted
Liquid phase downflow reactor
80% $H_2$ makeup gas purity

EXAMPLE 1

This example involves two operations with a nickel-molybdenum catalyst containing 3% nickel oxide and 15% molybdenum oxide supported on a conventional alumina base. This type of catalyst is commercially available as American Cyanamid HDS-3. In the first instance the catalyst is presulfided to a higher activity as described in the prior art cited above, i.e. 0.08 lb. sulfur/lb. catalyst. A solvent refined lube oil feedstock, known as bright stock, is hydrogenated to a 4.25 ASTM color. Reactor temperatures are increased as the sulfided nickel-moly catalyst activity declines until a predetermined maximum temperature is reached. In this example the operation began at 540°F. and continued to 670°F. When the upper temperature limit is reached the catalyst is then discarded. Without practicing $CS_2$ injection the catalyst life is about 14–16 barrels of oil processed per pound of catalyst, or in terms of onstream time about 230–280 days.

In the second part of this example, another batch of the same catalyst was presulfided to an activity such that after about 150 days the catalyst activity had declined to the extent that a temperature of 665°F. was required to effect the desired color. At that time 0.05 lb. $CS_2$ per lb. of catalyst was injected. As a result the required temperature was lowered from 665°F. to 640°F.

EXAMPLE 2

This second example describes the preferred method of periodic $CS_2$ injection to promote catalyst life.

A fresh portion of nickel-molybdenum catalyst as was used in Example 1 was sulfided initially with $CS_2$ to a level of 0.07 lb. sulfur per lb. of catalyst. After 1 month on-stream, $CS_2$ was injected to raise the sulfur level of the catalyst. In all, five more $CS_2$ injections were practiced at intervals of about 2–3 months. The total life of the catalyst was 31.0 barrels of oil per pound of catalyst compared to the normal 14–16 barrels per pound. During the injection periods lasting about 8 hrs., $H_2S$ concentration in the off-gas was 7–10 vol. % as compared to 2–4 vol. % before each injection period.

As is evidenced by these examples, the catalyst was reactivated appreciably and the catalyst life was there substantially lengthened.

Although $CS_2$ injection into the feed is the preferred means of sulfurizing according to the invention, other known means for sulfurizing catalysts, which are adaptable to sulfurizing during the course of hydrogenation can be used. A person skilled in the art can adapt such means to the process of the invention in the light of the present specification.

We claim as our invention:

1. A method for reactivating a sulfided Group VI metal hydrogenation catalyst which has become deactivated during use in hydrogenation of hydrocarbons comprising continuing said hydrogenation at an operating pressure of at least about 300 psig, an operating temperature range of at least about 350°F. to at least about 700°F. and a LHSV of at least about 0.2 to at least about 10.0 in the presence of added $CS_2$ or $H_2S$, thereby reactivating said catalyst in situ resulting in increased cycle life and decreased temperature required to maintain a fixed conversion level.

2. The method of claim 1 wherein said Group VI metal catalyst is a sulfided nickel-molybdenum catalyst.

3. The method of claim 1 wherein said sulfurizing agent in $H_2S$.

4. The method of claim 1 wherein said sulfurizing agent is $H_2S$ generated by injecting $CS_2$ into the reaction zone.

5. The method of claim 4 wherein said $CS_2$ is injected with the petroleum fraction feedstock in concentrations of from at least about 0.05 vol. % to 0.3 vol. % of the feed stream so as to maintain stable operation.

* * * * *